(12) United States Patent
Green et al.

(10) Patent No.: US 11,170,377 B2
(45) Date of Patent: Nov. 9, 2021

(54) METHODS AND SYSTEMS FOR IMPROVING PAYMENT CARD ACCEPTANCE QUALITY

(71) Applicant: MASTERCARD INTERNATIONAL INCORPORATED, Purchase, NY (US)

(72) Inventors: Leslie Y. Green, Saint Louis, MO (US); Travis C. Brooks, Wentzville, MO (US); Rebecca Harrison, Toronto (CA); Patrick M. Lewis, East Alton, IL (US); Meghan C. Minnear, Saint Louis, MO (US); Bonnie A. Weber, Eureka, MO (US); Sean A. Williams, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/509,586

(22) Filed: Jul. 12, 2019

(65) Prior Publication Data
US 2019/0340617 A1    Nov. 7, 2019

Related U.S. Application Data

(63) Continuation of application No. 14/219,822, filed on Mar. 19, 2014, now abandoned.

(51) Int. Cl.
*G06Q 20/40* (2012.01)
*G06Q 40/02* (2012.01)
*G06Q 20/42* (2012.01)

(52) U.S. Cl.
CPC ....... *G06Q 20/4016* (2013.01); *G06Q 20/425* (2013.01); *G06Q 40/02* (2013.01)

(58) Field of Classification Search
CPC ... G06Q 20/4016; G06Q 20/425; G06Q 40/02
See application file for complete search history.

(56) References Cited

U.S. PATENT DOCUMENTS

| 6,260,033 B1 * | 7/2001 | Tatsuoka | G01R 31/318371 434/322 |
| 7,613,672 B2 * | 11/2009 | West | G16H 40/63 706/48 |

(Continued)

FOREIGN PATENT DOCUMENTS

WO    WO-2006049841 A2 *    5/2006    ......... H04L 63/1433

OTHER PUBLICATIONS

DeSimone, Anna: Fannie Mae Issues Quality Control Self-Assessment Tool: May 10, 2013, Residential MortgageCompliance Monitor, pp. 1-12 (Year: 2013).*

(Continued)

*Primary Examiner* — Bijendra K Shrestha
(74) *Attorney, Agent, or Firm* — Armstrong Teasdale LLP

(57) ABSTRACT

A system and method for resolving an acceptance issue on a payment network are provided. The method includes receiving a notification message of an acceptance issue. The acceptance issue relates to an attempt by a cardholder to complete a transaction using a payment card over the payment network that is rejected. The method also includes classifying, by a computer device, the acceptance issue based on at least one of the notification message and results data of a first investigation, determining a remediation of the acceptance issue based on the classification and/or results data of a second investigation, and tracking, by the computer device, the acceptance issue, the classification, and the remediation using a single database. The method further includes implementing the determined remediation, and determining, by the computer device, at least one of a financial impact and a customer quality impact of the acceptance issue.

18 Claims, 11 Drawing Sheets

(56) References Cited

U.S. PATENT DOCUMENTS

| | | |
|---|---|---|
| 8,069,084 B2 | 11/2011 | Mackouse |
| 8,584,936 B2 | 11/2013 | Fiebiger |
| 8,600,899 B1 | 12/2013 | Davis |
| 8,966,041 B1 * | 2/2015 | Gatlin .................. G06Q 30/016 709/223 |
| 9,092,447 B1 * | 7/2015 | Anderson ................. G07F 7/04 |
| 2001/0044729 A1 * | 11/2001 | Pomerance .......... G06Q 50/182 705/309 |
| 2004/0128186 A1 * | 7/2004 | Breslin ............ G06Q 10/06311 705/7.13 |
| 2009/0106318 A1 * | 4/2009 | Mantripragada ... H04L 63/1408 |
| 2010/0050264 A1 | 2/2010 | Aebig |
| 2011/0106692 A1 * | 5/2011 | Moore ................... G06Q 40/02 705/38 |
| 2012/0053981 A1 * | 3/2012 | Lipps ................ G06Q 10/0635 705/7.28 |
| 2013/0013514 A1 | 1/2013 | Mackouse |
| 2013/0055042 A1 * | 2/2013 | Al Za'noun ..... G06Q 10/06395 714/746 |
| 2013/0226717 A1 * | 8/2013 | Ahluwalia ......... G06Q 20/3821 705/16 |
| 2013/0226720 A1 | 8/2013 | Ahluwalia |
| 2014/0229614 A1 | 8/2014 | Aggarwal |
| 2014/0372294 A1 | 12/2014 | Tatham |

OTHER PUBLICATIONS

Mochal, Tom: Resolve Quality Problems in Six Steps, Jul. 25, 2006, Project Management, pp. 1-6. (Year: 2006).*

PCI Security Sandards Council: Payment card Industry (PCI) Payment Application Data Security Standard (PA-DSS), Program Guide, Version 1.2, Oct. 2008, pp. 1-36 (Year: 2008).*

DeGennrao, Ramon P.: Merchant Acquirers and Payment Card Processors: A look inside the Black Box, First Quarter 2006, Federal Reserve Bank of Atlanta, pp. 27-42.

* cited by examiner

METHODS AND SYSTEMS FOR IMPROVING PAYMENT CARD ACCEPTANCE QUALITY

CROSS REFERENCE TO RELATED APPLICATIONS

This application is a continuation application of U.S. patent application Ser. No. 14/219,822, filed Mar. 19, 2014, entitled "METHODS AND SYSTEMS FOR IMPROVING PAYMENT CARD ACCEPTANCE QUALITY", the disclosure of which is hereby incorporated herein by reference in its entirety.

BACKGROUND OF THE DISCLOSURE

The field of the disclosure relates generally to a payment network, and more specifically, to a method and system for managing acceptance issues associated with the payment transactions.

An acceptance issue occurs when a payment card cardholder cannot complete a transaction at the point of interaction, and has to use another method of payment to obtain a good or service. Typically, acceptance issues are researched and remediated on an ad hoc basis by personnel associated with an area of the payment network processing the transaction that is a source of the acceptance issue. Such a process prevents globally addressing the acceptance issue, applying the determined remediations to other potentially affected areas of the payment network, following up to ensure the remediation is implemented, and monitoring the remediation to ensure it actually resolved the acceptance issue.

BRIEF DESCRIPTION OF THE DISCLOSURE

In one aspect, a computer-implemented method for resolving an acceptance issue on a payment network includes receiving a notification message of an acceptance issue. The acceptance issue relates to an attempt by a cardholder to complete a transaction using a payment card over the payment network that is rejected. The method also includes classifying, by the computer device, the acceptance issue based on at least one of the notification message and results data of a first investigation, determining a remediation of the acceptance issue based on the classification and/or results data of a second investigation, and tracking, by the computer device, the acceptance issue, the classification, and the remediation using a single database. The method further includes implementing the determined remediation, and determining, by the computer device, at least one of a financial impact and a customer quality impact of the acceptance issue.

In another aspect, a customer quality acceptance (CQA) computing device for use in managing acceptances issues in a payment network includes one or more memory devices and one or more processors coupled to the one or more memory devices. The processor is configured to receive a notification message of an acceptance issue wherein the acceptance issue relating to an attempt by a cardholder to complete a transaction using a payment card over the payment network that is rejected. The processor is also configured to classify the acceptance issue based on at least one of the notification message and results data of a first investigation, determine a remediation of the acceptance issue based on the classification and/or results data of a second investigation, and track the acceptance issue, the classification, and the remediation using a single database. The processor is further configured to implement the determined remediation and determine at least one of a financial impact and a customer quality impact of the acceptance issue.

In yet another aspect, a computer readable medium has computer-executable instructions for managing acceptances issues in a payment network embodied thereon. When executed by at least one processor, the computer-executable instructions cause the at least one processor to receive a notification message of an acceptance issue from at least one of the cardholder, an issuer, an acquirer, a merchant, and the payment network wherein the acceptance issue relates to an attempt by a cardholder to complete a transaction using a payment card over the payment network that is rejected. The computer-executable instructions cause the at least one processor to classify the acceptance issue based on at least one of the notification message and results data of a first investigation, determine a remediation of the acceptance issue based on the classification and/or results data of a second investigation, and track the acceptance issue, the classification, and the remediation using a single database. The computer-executable instructions further cause the at least one processor to receive a progress of implementation of the determined remediation and determine at least one of a financial impact and a customer quality impact of the acceptance issue.

BRIEF DESCRIPTION OF THE DRAWINGS

FIG. 1 is a schematic diagram illustrating an example multi-party transaction payment processing system for enabling ordinary payment transactions in which merchants and card issuers do not need to have a one-to-one special relationship.

FIG. 2 is a simplified block diagram of an example processing system including a customer quality acceptance (CQA) computing device in communication with a plurality of other computer devices in accordance with one embodiment of the present disclosure.

FIG. 3 is an expanded block diagram of an example server architecture of a processing system including a customer quality acceptance (CQA) environment including other computer devices in accordance with one embodiment of the present disclosure.

FIG. 4 illustrates an example configuration of a merchant system operated by a user, such as an individual associated with the merchant shown in FIG. 1.

FIG. 5 illustrates an example configuration of a server system such as the server system shown in FIGS. 2 and 3.

FIG. 6 is a flowchart illustrating an example method for resolving an acceptance issue on the payment network shown in FIG. 1.

FIG. 7 is a flowchart illustrating path "A" of the method shown in FIG. 6.

FIG. 8 is a flowchart illustrating path "B" of the method shown in FIG. 6.

FIG. 9 is a flowchart illustrating path "C" of the method shown in FIG. 6.

FIG. 10 is a flowchart illustrating the final steps of the method shown in FIG. 6.

FIG. 11 is a diagram of a component layout of the computing device shown in FIGS. 2 and 3.

DETAILED DESCRIPTION OF THE DISCLOSURE

Figure 1:
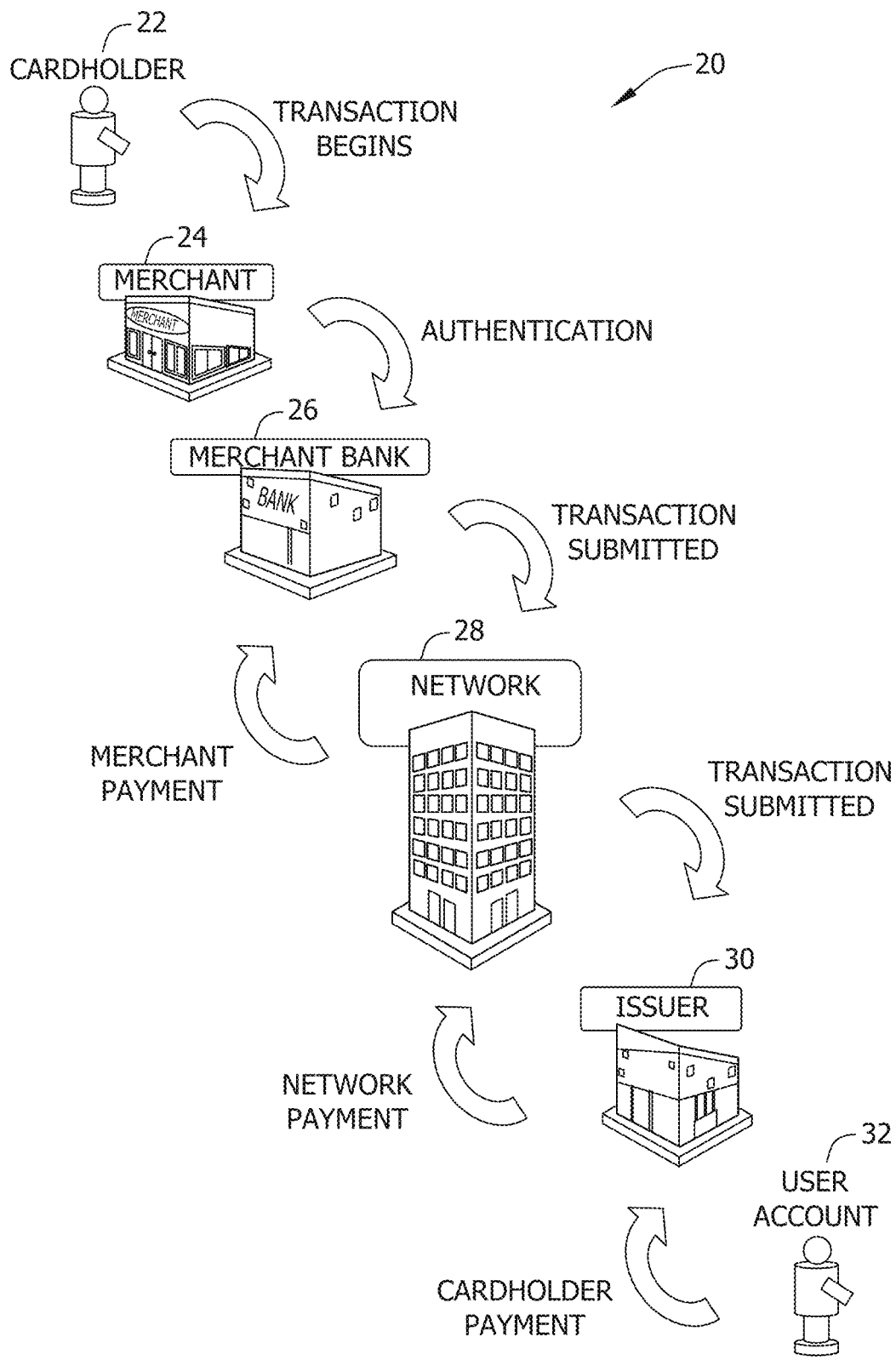
FIGS. 1-11 show example embodiments of the method and system described herein.

Embodiments of the present disclosure describe a customer quality acceptance (CQA) system including CQA computing device in communication with a payment processing system and a services system. The CQA computing device manages acceptance issues associated with payment transactions performed between cardholders and merchants using a payment network. More specifically, the CQA computing device receives information regarding an acceptance issue when a cardholder attempts to make a purchase using a payment card, determines a source of the acceptance issue, and determines a remediation of the acceptance issue using the received information and results data of an initial investigation. The CQA computing device determines an impact of the acceptance issue in terms of a financial or customer service impact. For example, the CQA computing device initiates a tracking record in a central memory device in, for example, a single database, determines a root cause of the acceptance issue, determines a remediation for the acceptance issue, tracks the remediation through implementation, and monitors for all issues that may have been caused by the remediation.

Further embodiments implement a process where all acceptance issues are routed to a single entity that has responsibility to classify, investigate, track, and drive the remediation of the acceptance issue to completion. The single entity also monitors the remediation after implementation to ensure the acceptance issue has been resolved, and quantifies the financial and quality impact of the acceptance issue on the payment network. The quality impact relates to a number of transactions and/or a number of payment card cardholders that are impacted by the acceptance issue. The financial impact relates to a money or financial value cost to any of the parties of the four-party model impacted by the acceptance issue. The information relating to the acceptance issue is maintained in a single database and is used for periodic reporting and research for trends of acceptance issues.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, systems and methods of managing acceptance issues in a payment network. However, it is contemplated that this disclosure has general application to managing hardware and processing issues in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a schematic diagram illustrating an example multi-party transaction payment processing system 20 for enabling ordinary payment transactions in which merchants 24 and card issuers 30 do not need to have a one-to-one special relationship. Embodiments described herein may relate to a transaction system, such as the payment network operated by MasterCard International Incorporated. The payment card network, as described herein, is a four-party payment card interchange network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network.

In a typical payment processing system, a financial institution called the "issuer" 30 issues a payment card, such as a credit card, debit card, electronic check, prepaid card, paper check, mobile phone with access to a payment account, or any other form of payment, to a cardholder 22, who uses the payment card to tender payment for a purchase from a merchant 24. To accept payment with the payment card, merchant 24 must normally establish an account with a financial institution that is part of the financial payment processing system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale (POS) terminal, which reads cardholder's 22 account information from a magnetic stripe, a chip, embossed characters, or other device on the payment card that may be manually inputted into the POS terminal, and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 28, computers of merchant bank 26 or merchant processor will communicate with computers of an issuer bank 30 to determine whether the payment transaction should be authorized. This may include a number of factors such as, whether cardholder's 22 account 32 is in good standing, and whether the purchase is covered by cardholder's 22 available credit line. If the request is accepted, an authorization code is issued to merchant 24.

When a request for authorization is accepted, the available credit line of cardholder's 22 account 32 is decreased. In some cases, a charge for a payment transaction may not be posted, i.e., "captured" immediately to cardholder's 22 account 32, whereas in other cases, especially with respect to at least some debit card transactions, a charge may be posted or captured at the time of the transaction. In some cases, when merchant 24 ships or delivers the goods or services, merchant 24 captures the transaction by, for example, appropriate data entry procedures on the POS terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment network 28 and/or issuer bank 30 stores the payment card information, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among the accounts of merchant 24, merchant bank 26, and issuer bank 30 related to the transaction. Usually, transactions are captured and accumulated into a "batch," which is settled as a group. More specifically, a transaction is typically settled between issuer bank 30 and payment network 28, and then between payment network 28 and merchant bank 26, and then between merchant bank 26 and merchant 24.

Figure 2:
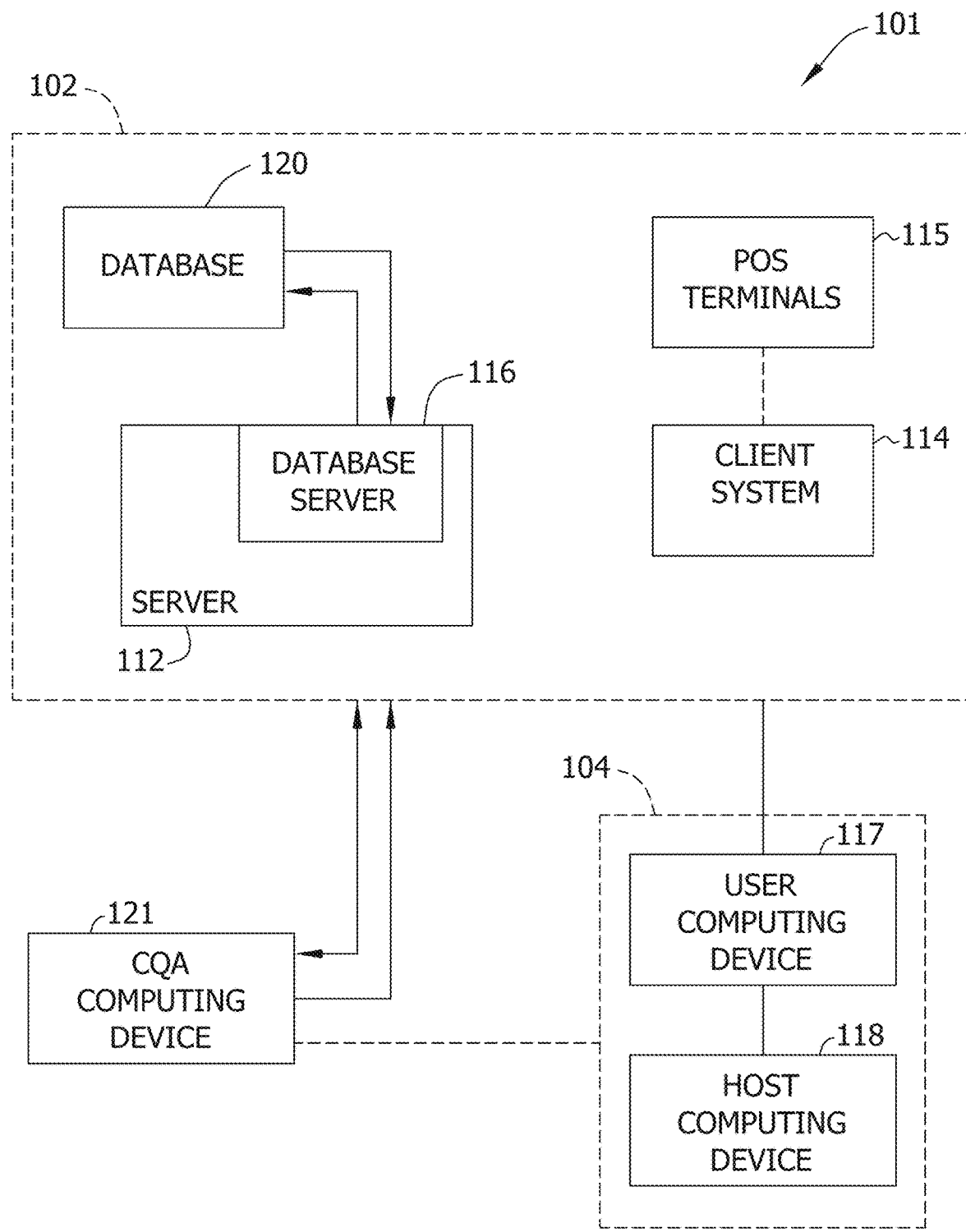

FIG. 2 is a simplified block diagram of an example processing system 100 including a CQA computing device in communication with a plurality of other computer devices in accordance with one embodiment of the present disclosure. In the example embodiment, processing system 100 may be used for performing payment-by-card transactions and/or processing acceptance issues in a central location. Processing system 100 or a portion of processing system 100 may form a Customer Quality Acceptance (CQA) environment 101 that includes a plurality of systems and computing devices, such as a payment sub-system 102, a services sub-system 104, and a CQA computing device 121. Payment sub-system 102 includes a plurality of computer devices such as server system 112, client systems 114, POS terminals 115, and database 120. Payment sub-system 102 processes payment transactions between a cardholder 22 and a plurality of merchants 24, and generates transaction data based on those transactions. Services sub-system 104 includes a cardholder computing device 117 and a host computing device 118, the host computing device 118 stores data and/or provides services that are accessed by cardholder computing device 117. Services sub-system 104 may communicate with CQA computing device 121 to manage communications between cardholder computing device 117 and host computing device 118.

In the example embodiment, payment sub-system 102 includes server system 112, and a plurality of client systems 114 connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment sub-system 102 also includes point-of-sale (POS) terminals 115, which may be connected to client systems 114, and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's payment card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network, including data relating to merchants, account holders or customers, issuers, acquirers, and/or purchases made. In one implementation, database 120 stores transaction data including at least one of timestamp data indicative of a time the transaction occurred, purchase data indicative of a product, i.e., a good or service, that has been purchased and/or leased, purchase amount data indicative of an amount of funds associated with the transaction, merchant data including a merchant identifier that identifies the merchant associated with the payment transaction, and/or cardholder data including at least one of a cardholder name, a cardholder address, an account number, and other account identifier. Database 120 may store the merchant identifier in a list that identifies each merchant registered to use the network, and instructions for settling transactions including merchant bank account information.

Services sub-system 104 includes cardholder computing device 117 and host computing device 118. Host computing device 118 is configured to communicate with at least one of server system 112, client systems 114, and cardholder computing device 117. In the exemplary embodiment, host computing device 118 is associated with or controlled by a service provider for securely storing data and providing secure services. Host computing device 118 is interconnected to the Internet through many interfaces including a network, such as a local area network (LAN) or a wide area network (WAN), dial-in-connections, cable modems, wireless modems, and special high-speed ISDN lines. Host computing device 118 could be any device capable of interconnecting to the Internet including a web-based phone, personal digital assistant (PDA), or other web-based connectable equipment. In one embodiment, host computing device 118 is configured to communicate with client system 114 and/or cardholder computing device 117 using various outputs including, for example, Bluetooth communication, radio frequency communication, near field communication, network-based communication, and the like. More specifically, in one embodiment, host computing device 118 communicates with cardholder computing device 117 through a website associated with the service provider.

CQA environment 101 also includes CQA computing device 121 that is in communication with payment sub-system 102 and/or services sub-system 104. CQA computing device 121 may be a stand-alone computing device that includes one or more processors and one or more memory devices and is configured to communicate with server system 112, client system 114, cardholder computing device 117, host computing device 118, and/or database 120. Alternatively, CQA computing device 121 may be integrated with server system 112. CQA computing device 121 provides services that enable host computing device 118 to receive an acceptance issue notification message, request additional information from parties that may be a source of the acceptance issue, and facilitate determining a remediation of the acceptance issue. More specifically, CQA computing device 121 facilitates managing acceptance issues in network 28 (shown in FIG. 1).

In the example embodiment, one of client systems 114 may be associated with acquirer bank 26, and/or merchant 24 while another one of client systems 114 may be associated with issuer 30, and/or cardholder 22 or other user. Cardholder computing device 117 is associated with cardholder 22; POS terminal 115 may be associated with merchant 24; host computing device 118 may be associated with a service provider, and server system 112 may be associated with payment sub-system 102.

Figure 3:
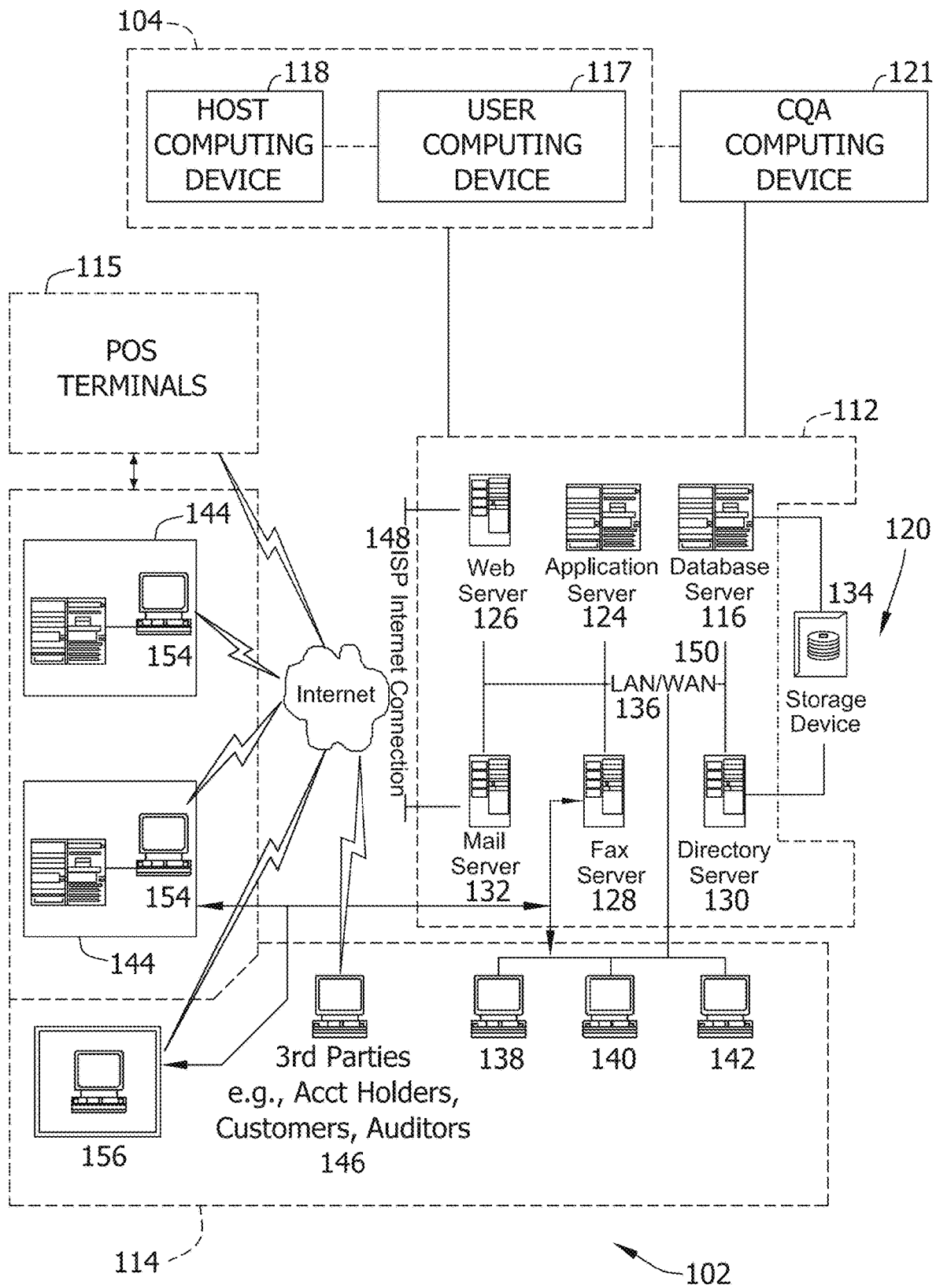

FIG. 3 is an expanded block diagram of an example server architecture of CQA environment 101 including other computer devices in accordance with one embodiment of the present disclosure. Payment sub-system 102 includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser, or the like. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet and a WAN type communication, however, any other type communication can be utilized in other embodiments, i.e., the systems and processes are not limited to being practiced using the Internet. In addition, rather than WAN 150, LAN 136 could be used.

In the example embodiment, any authorized individual having a workstation 154 can access processing system 100. At least one of the client systems 114 includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including manager workstation 156 using, for example, a telephone link. Fax server 128 is configured to communicate with workstations 138, 140, and 142 as well.

Services sub-system 104, including cardholder computing device 117 and host computing device 118, may communicate internally, and with payment sub-system 102 and CQA computing device 121, through any suitable network communication method including, but not limited to, WAN 150 type communications, LAN 136 type communications, 3G type communications, or WIMAX type communications.

CQA computing device 121 may communicate with payment sub-system 102 and services sub-system 104 through any suitable network communication method including, but not limited to, Wide Area Network (WAN) 150 type communications, LAN 136 type communications, 3G type communications, or Worldwide Interoperability for Microwave Access (WIMAX) type communications.

Figure 4:
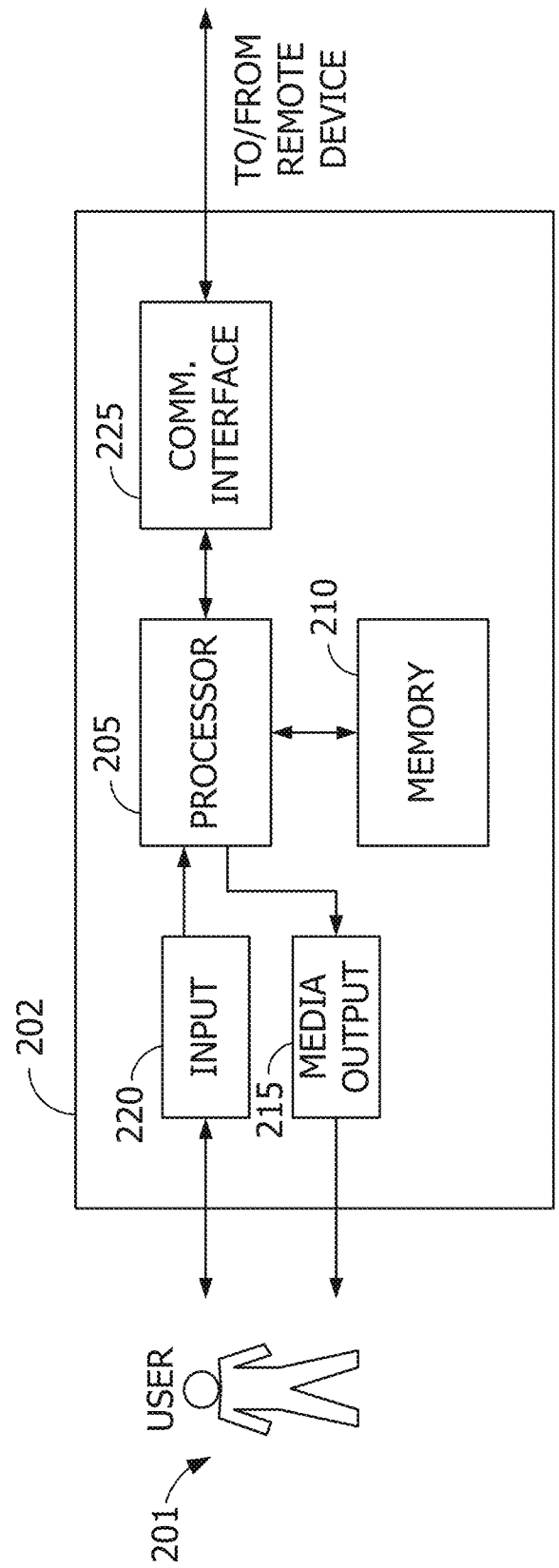

FIG. 4 illustrates an example configuration of a merchant system 202 operated by a user 201, such as an individual associated with merchant 24 (shown in FIG. 1). Merchant system 202 may include, but is not limited to, client systems 114, 138, 140, and 142, POS terminal 115, cardholder computing device 117, host computing device 118, CQA computing device 121, workstation 154, and manager workstation 156. In the example embodiment, merchant system 202 includes one or more processors 205 for executing instructions. In some embodiments, executable instructions are stored in a memory area 210. Processor 205 may include one or more processing units, for example, in a multi-core configuration. Memory area 210 is any device allowing information, such as executable instructions and/or written works, to be stored and retrieved. Memory area 210 may include one or more computer readable media.

Merchant system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, such as a speaker or headphones.

In some embodiments, merchant system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, and/or an audio input device. A single component such as a touch screen may function as both an output device of media output component 215 and input device 220. Merchant system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications, 3G, or other mobile data network such as WIMAX.

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
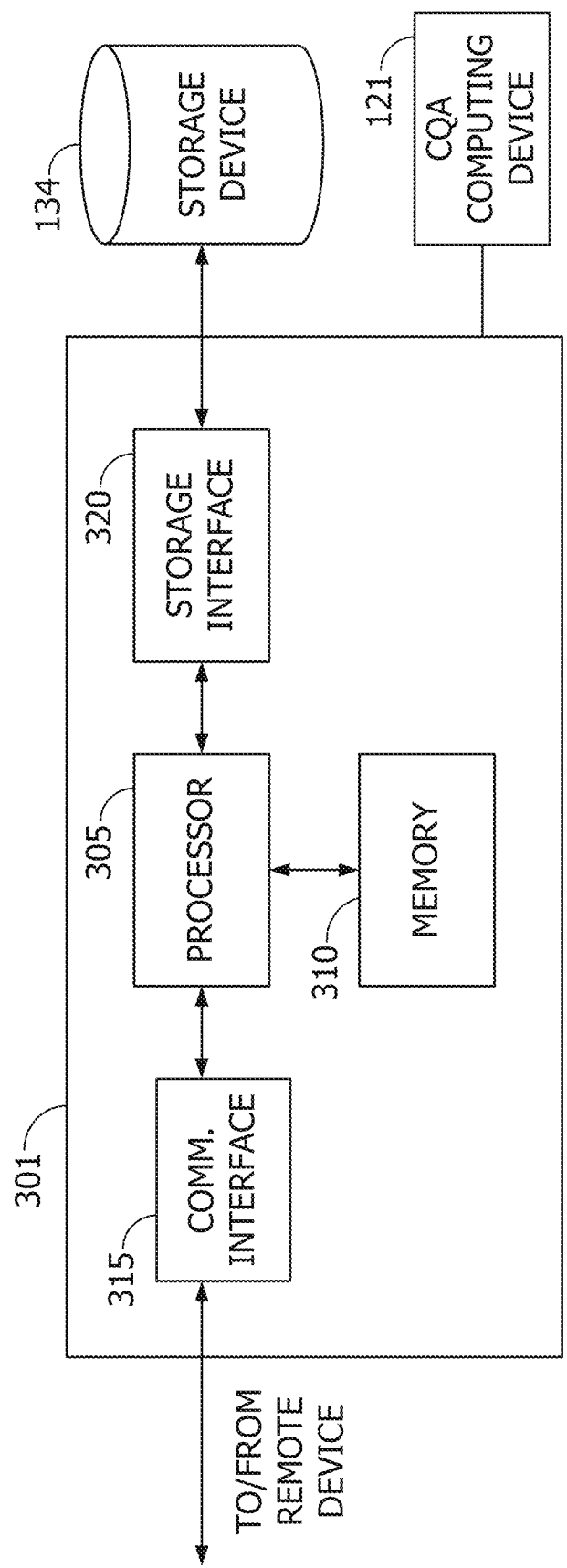

FIG. 5 illustrates an example configuration of a server system 301 such as server system 112 (shown in FIGS. 2 and 3). Server system 301 may include, but is not limited to, database server 116, application server 124, web server 126, fax server 128, directory server 130, and mail server 132.

Server system 301 includes one or more processors 305 for executing instructions. Instructions may be stored in a memory area 310, for example. Processor 305 may include one or more processing units (e.g., in a multi-core configuration) for executing instructions. The instructions may be executed within a variety of different operating systems on the server system 301. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Server system 301 may be communicatively coupled to CQA computing device 121. CQA computing device 121 enables server system 301 to offer authentication services, including services to confirm the identity of a user accessing information from host computing device 118 (shown in FIG. 2). In the example embodiment, CQA computing device 121 may be external to server system 301 and may be accessed by multiple server systems 301. For example, CQA computing device 121 may be a stand-alone computing device coupled to one or more memory devices. In some embodiments, CQA computing device 121 may be integrated with server system 301. For example, CQA computing device 121 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from client system 114 and host computing device 118 via the Internet, as illustrated in FIGS. 2 and 3.

Processor 305 may be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
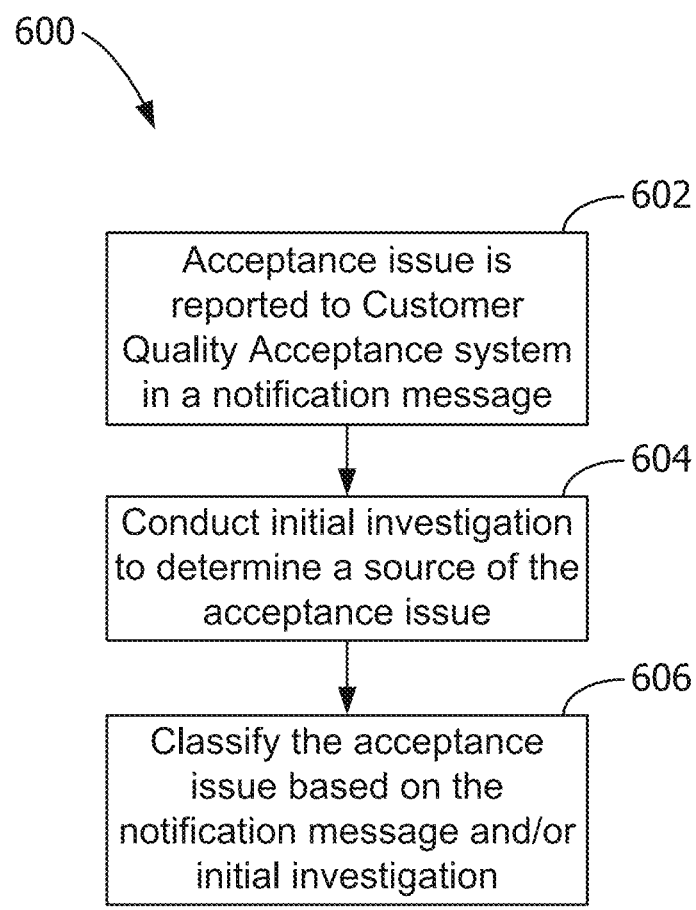
Figure 7:
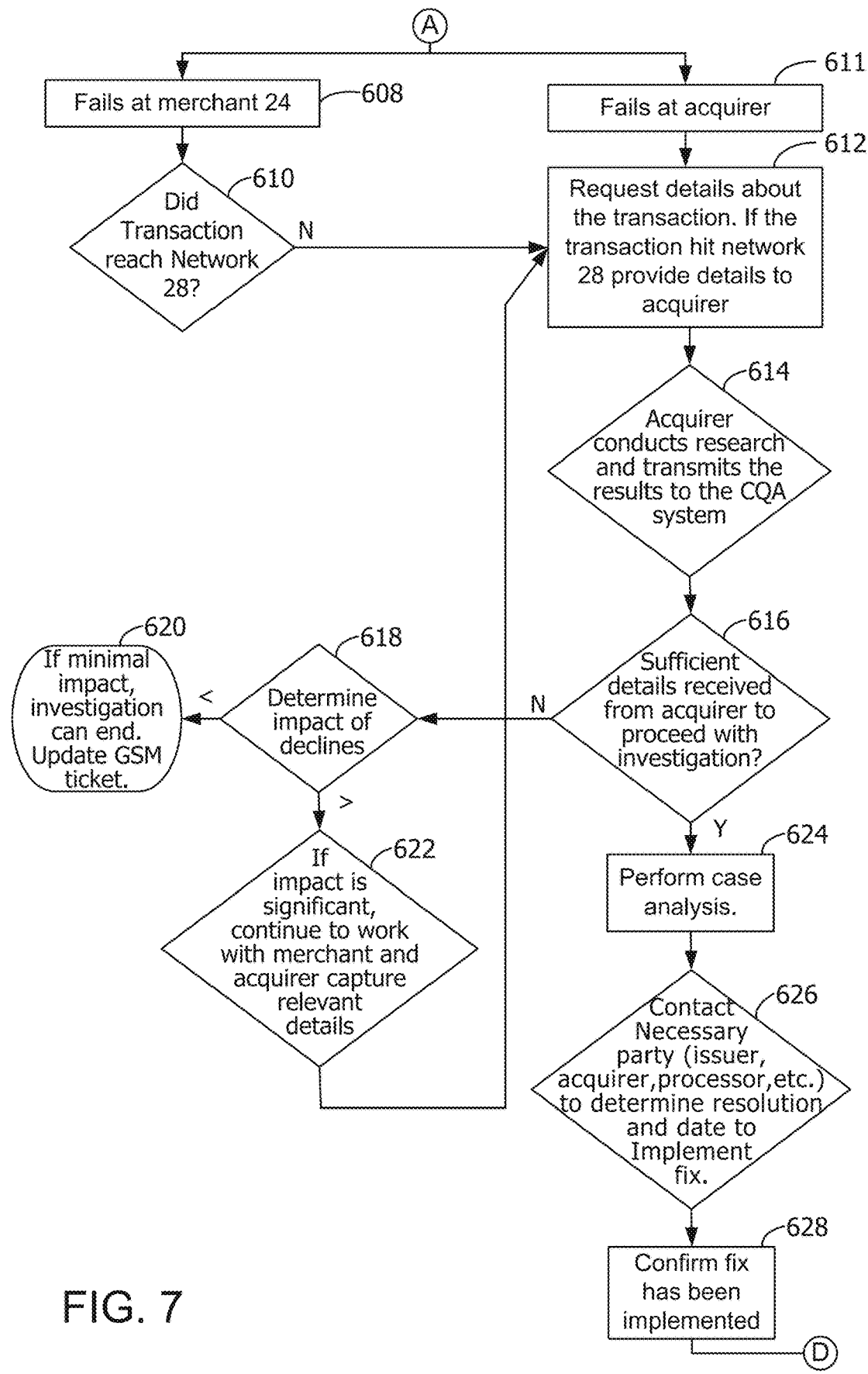
Figure 8:
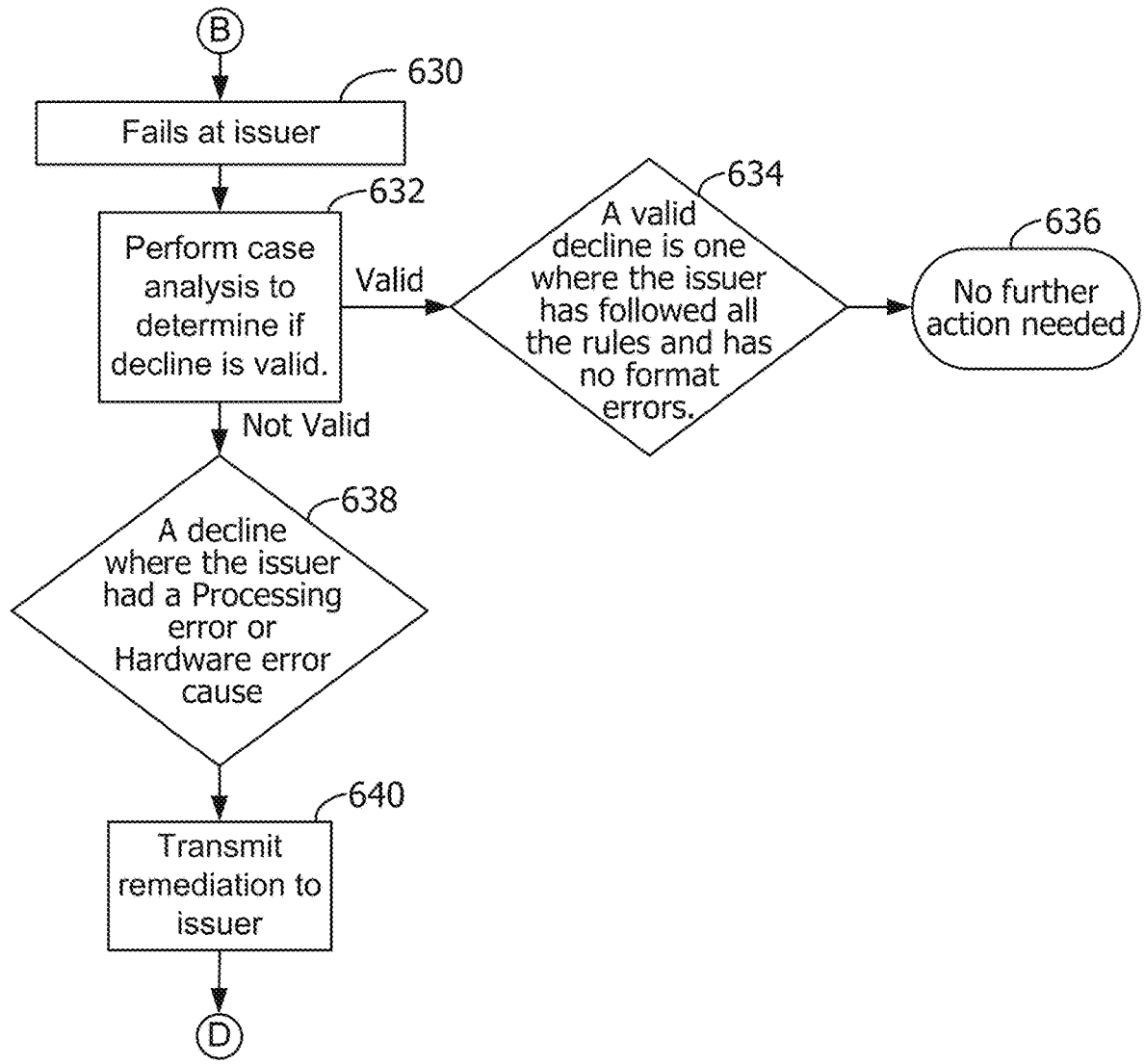
Figure 9:
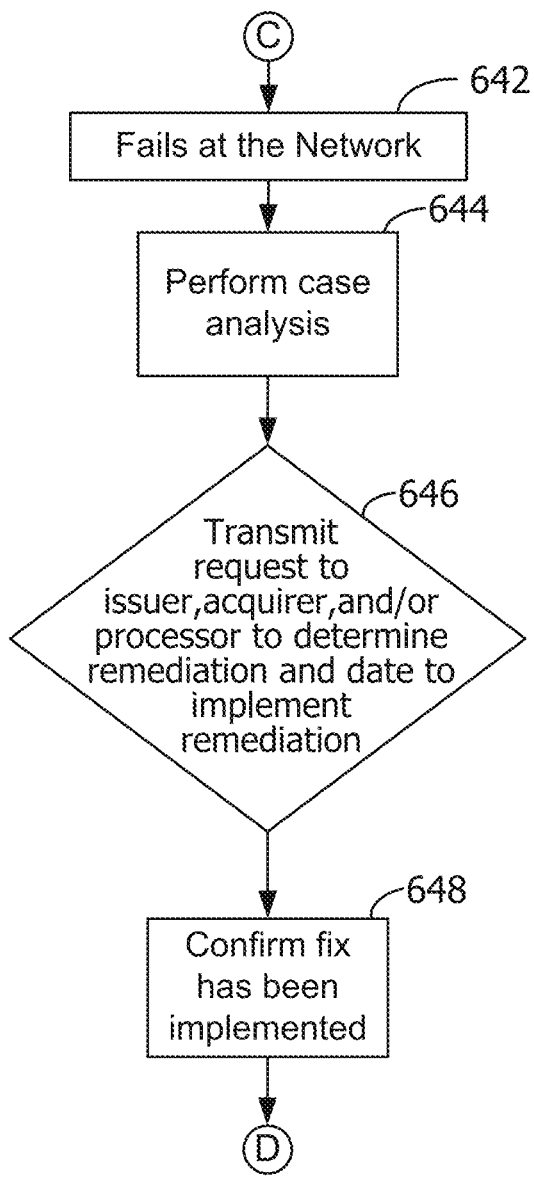

FIG. 6 is a flowchart illustrating an example method 600 for resolving an acceptance issue on payment network 28 (shown in FIG. 1). In the example embodiment, method 600 includes receiving 602 a notification message of an acceptance issue. The acceptance issue relates to an attempt by cardholder 22 to complete a transaction 601 using a payment card over payment network 28 and the transaction attempt is rejected. The notification message is received by CQA computing device 121 either directly or through one of the parties of the four-party model, for example, merchant 24, acquirer 26, network 28 and/or issuer 30. The notification message may be received from cardholder 22 using, for example, but not limited to, a text message, email message, telephone call, or web site. An initial investigation is conducted 604 to determine a source of the acceptance issue. In one embodiment, the initial investigation includes manual collecting of information from potential sources of the issue, such as, but, not limited to merchant 24, acquirer 26, network 28 and/or issuer 30. Some information may be resident in systems of network 28. Other information may be resident on other systems where there is no direct access and a communication to others of the four-party model may be required. The communication may take the form of a phone call or email to the other party. In various embodiments, the communication is automated using for example, API calls to another entities system or other method. The acceptance issue is classified 606 based on at least one of the notification message and the initial investigation and a tracking entry is made into a Global Service Manager (GSM) acceptance data section of database 120. If the initial investigation determines merchant 24 or acquirer 26 is the source of the acceptance issue, method 600 follows path "A" as shown in FIG. 7. If results data of the initial investigation determines issuer 30 is the source of the acceptance issue, method 600 follows path "B" as shown in FIG. 8. If results data of the initial investigation determines network 28 is the source of the acceptance issue, method 600 follows path "C" as shown in FIG. 9.

FIG. 7 is a flowchart illustrating path "A" of method 600 (shown in FIG. 6) wherein the acceptance issue is determined to be associated with merchant 24 or acquirer 26. The initial investigation of acceptance issue 601 (shown in FIG. 6) attempts to determine if the source of the acceptance issue is merchant 24 or acquirer 26. In attempting to determine 608 if merchant 24 is the source of the acceptance issue, a determination 610 is made as to whether transaction information for attempted transaction 601 was able to reach network 28. If yes, method 600 follows path "C" as shown in FIG. 9. If no, where merchant 24 may be the source of the acceptance issue, transaction information and acceptance information for acceptance issue 601 is unavailable at network 28 because the acceptance issue occurred before an authorization request message for attempted transaction 601 reached network 28. Additionally, if acquirer 26 is determined 611 to be the source of the acceptance issue, network 28 does not have sufficient information to determine a cause of the acceptance issue. A request is transmitted 612 to acquirer 26 for additional details of attempted transaction 601. Based on the request, acquirer 26 conducts 614 an investigation of its own system. Any results data of the acquirer's investigation are transmitted to CQA computing device 121. If acquirer 26 has no details relating to the source of the acceptance issue, the acceptance issue is isolated to merchant 24. If acquirer 26 has only limited details, there may be insufficient details relating to the source of the acceptance issue to continue with a second investigation. CQA computing device 121 determines 616 if there are sufficient details relating to the source of the acceptance issue to conduct a second investigation using predetermined rules. If there are insufficient details regarding the acceptance issue, as determined by the acquirer's investigation, an impact of the declines resulting from the acceptance issue is determined 618 by, for example, CQA computing device 121.

In various embodiments, a financial impact and/or a customer quality impact of the acceptance issue are determined by CQA computing device 121. The quality impact relates to a number of transactions and/or a number of payment card cardholders that are impacted by the acceptance issue. The financial impact relates to a money or financial value cost to any of the parties of the four-party model impacted by the acceptance issue. In other embodiments, the impact may be determined by another component of processing system 100, by a third party provider, or by a human expert. If the determined impact does not reach a predetermined threshold, CQA computing device 121 displays a recommendation to terminate the investigation 620 and the record in the GSM acceptance data section of database 120 is annotated by, for example, updating the classification of the acceptance issue.

If the determined impact meets the predetermined threshold, the second investigation is initiated 622. CQA computing device 121 again transmits 612 a request to acquirer 26 for additional details of attempted transaction 601. Based on the request, acquirer 26 conducts 614 an investigation of its own system. Any results data of the acquirer's second investigation are transmitted to CQA computing device 121.

If CQA computing device 121 determines 616 there are sufficient details, using predetermined rules and/or human expert input, to conduct a second investigation, a case analysis is performed 624. The case analysis includes verifying the opening of a case matter in the GSM acceptance data section of database 120. The open case matter permits or initiates notification of responsible or interested parties and tracking the acceptance issue to remediation and post-remediation to ensure the determined remediation actually resolved the acceptance issue and did not create other issues. The case analysis also includes determining a financial and/or customer service impact of the acceptance issue, for example, by CQA computing device 121. Although, all information required to complete an impact analysis may not be available initially, the case analysis is used to initially estimate the impact for prioritization purposes and to establish what further information will need to be acquired to complete the impact analysis portion of the case analysis.

A remediation of the acceptance issue is determined 626 by, for example, CQA computing device 121, using information received from the party that is the source of the acceptance issue and other parties that may have information regarding the acceptance issue. Any determined remediation may require a sufficient time period to plan and implement. In various embodiments, a time table or schedule for implementing the determined remediation is determined by CQA computing device 121. In other embodiments, the time table is determined by another component of processing system 100, by a third party provider, or by a human expert. The remediation, time table for implementation, and a responsible party are entered into the GSM acceptance data section of database 120 for future tracking and updating any determined impact of the acceptance issue. Periodic progress checking is performed by CQA computing device 121, to determine the remediation has been implemented 628.

FIG. 8 is a flowchart illustrating path "B" of method 600 (shown in FIG. 6) where the acceptance issue is determined to be associated with issuer 30. If results data of the initial investigation determines 630 that issuer 30 is the source of the acceptance issue relating to attempted transaction 601, a case analysis is performed 632 to determine if the decline is valid. If the case analysis determines 634 the decline is valid, no further action need be taken by CQA computing device 121 and the acceptance issue tracking entry in the GSM acceptance data section of database 120 is closed 636. If the decline is valid 638, CQA computing device 121 determines whether the source of the decline is due to a processing error such as a format error or due to a hardware error and transmits 640 a remediation to issuer 30.

FIG. 9 is a flowchart illustrating path "C" of method 600 (shown in FIG. 6) where the acceptance issue is determined to be associated with network 28. If results data of the initial investigation determines 642 that network 28 is the source of the acceptance issue relating to attempted transaction 601, a case analysis is performed 644 as described above. A request is transmitted 646 by, for example, CQA computing device 121, to at least one of issuer 30, acquirer 26, and one or more processors to facilitate determining a remediation of the acceptance issue. A date for implementing the remediation is determined based on the case analysis, as well as any intermediate milestones. As the remediation is implemented, tracking is performed on actions taken and the actions are recorded in the GSM acceptance data section of database 120. CQA computing device 121 periodically checks the milestones for completion and reports progress to parties identified in the associated acceptance issue record in the GSM acceptance data section of database 120. The remediation is confirmed 648 as having resolved the acceptance issue and the associated acceptance issue tracking entry is closed.

Figure 10:
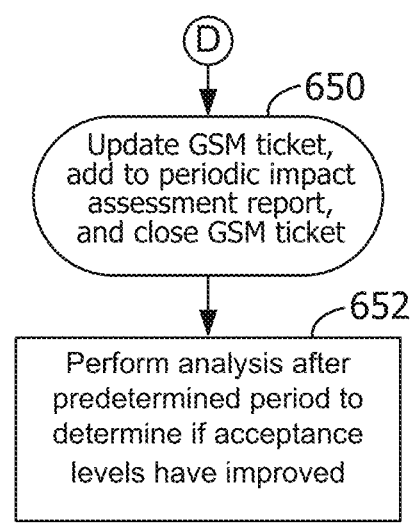

FIG. 10 is a flowchart illustrating additional steps of method 600 (shown in FIG. 6). After a remediation is implemented for any of the sources of the acceptance issue, merchant 24, acquirer 26, issuer 30, and network 28, the associated acceptance issue record in the GSM acceptance data section of database 120 is updated to document the status of the remediation and the associated acceptance issue record is added 650 to a periodic impact assessment report and the associated tracking entry is closed. Each acceptance issue continues to be monitored after remediation and periodic reports are analyzed to determine 652, by CQA computing device 121, another component of processing system 100, a third party provider, or a human expert whether the remediation actually resolved the acceptance issue and did not cause other issues, including other acceptance issues. In one embodiment, an assessment of whether the acceptance levels have improved post implementation of the remediation is conducted.

Figure 11:
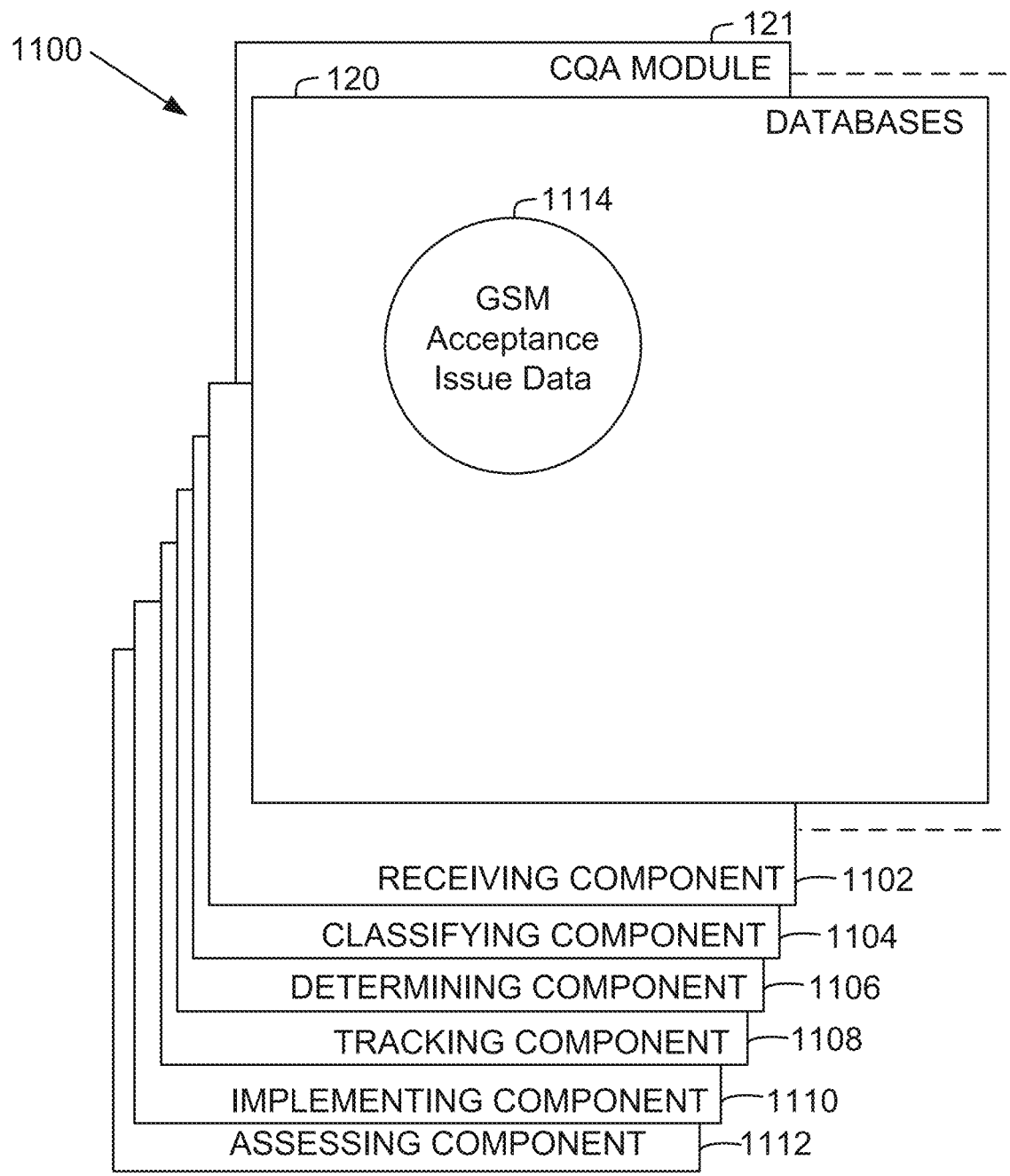

FIG. 11 is a diagram of a component layout 1100 of a computing device as shown in FIGS. 2-3. For example, one or more computing devices may form CQA computing device 121. FIG. 8 further shows a configuration of database

120. Database 120 is coupled to several separate components within CQA computing device 121, which perform specific tasks.

CQA computing device 121 includes a receiving component 1102 for receiving a notification message of an acceptance issue wherein the acceptance issue relates to an attempt by cardholder 22 to complete a transaction using a payment card over payment network 28 that is rejected. The rejection may be made at POS 115 of merchant 24, at merchant bank 26, network 28, or issuer 30. The rejection may be valid, for example, if cardholder 22 has insufficient funds available to cardholder account 32, cardholder account 32 is blocked, or other valid reason. The rejection may also be not valid, for example, if there is a hardware or a processing error. An example of a processing error is an authorization request message having a formatting error. Whereas an example of a hardware error may be the POS 115 device having a malfunction.

CQA computing device 121 also includes a classifying component 1104 for classifying the acceptance issue based on at least one of the notification message and results data of a first investigation. The notification message may include sufficient information for CQA computing device 121 to classify the acceptance issue. If not, the classification may be made on an interim basis pending results data of the initial investigation. Also a human expert may intervene to determine a classification of the acceptance issue. CQA computing device 121 also includes a determining component 1106 for determining a remediation of the acceptance issue based on the classification and/or results data of a second investigation.

CQA computing device 121 further includes a tracking component 1108 for tracking the acceptance issue, the classification, and the remediation using a single database. Tracking the acceptance issue through all phases of remediating the acceptance issue in a single location permits notifying responsible parties of tasks coming due, determining a source of the acceptance issue, determining a root cause of the acceptance issue, determining a potential for similarly working systems or sub-systems to become future acceptance issues, and determining a financial and/or customer service impact of the acceptance issue. CQA computing device 121 an implementing component 1110 for implementing the determined remediation, and an assessing component 1112 for assessing at least one of a financial impact and/or a customer quality impact of the acceptance issue.

In an example embodiment, database 120 includes, but is not limited to, a GSM acceptance data section 1114. GSM acceptance data section 1114 includes acceptance issue data associated with a plurality of attempted payment transactions performed by a plurality of cardholders 22 over payment sub-system 102 (shown in FIG. 2)

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 205, 305, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for (a) receiving a notification message of an acceptance issue, the acceptance issue relating to an attempt by a cardholder to complete a transaction using a payment card over the payment network that is rejected, (b) classifying the acceptance issue based on at least one of the notification message and results data of a first investigation, (c) determining a remediation of the acceptance issue based on the classification and/or results data of a second investigation, (d) tracking the acceptance issue, the classification, and the remediation using a single database, (e) implementing the determined remediation, and (f) assessing at least one of a financial impact and/or a customer quality impact of the acceptance issue.

Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments provide a method and system of managing, in a single location, acceptance issues for attempts, by payment cardholders, to use a payment card network that are rejected.

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for identifying, investigating, tracking, and resolving an acceptance issue occurring on a payment network using an acceptance issue record, the acceptance issue record being an improved acceptance issue record that includes a complete management record of the acceptance issue, the method implemented using a customer quality acceptance (CQA) computing device, the method comprising:

receiving, at the CQA computing device, a notification message of an acceptance issue occurring somewhere on the payment network, the acceptance issue relating to a transaction completion attempt by a cardholder using a payment card that is processed over the payment network that is rejected, the CQA computing device communicatively coupled between a payment sub-system and a services sub-system over a network, the payment sub-system including a server system and a plurality of client systems communicatively coupled to the server system, the plurality of client systems including a merchant computing device, an acquirer computing device, and an issuer computing device, the services sub-system including a host computing device communicatively coupled to a cardholder computing device, the host computing device communicating with the cardholder computing device through a website associated with a service provider that operates the host computing device, the notification message received at the CQA computing device from the cardholder computing device via the host computing device;

conducting, by the CQA computing device, a first investigation to determine whether the merchant computing device, the acquirer computing device, the issuer computing device, or the payment network is a source of the acceptance issue by:
automatically issuing API calls to the merchant computing device, the acquirer computing device, the issuer computing device, and the payment network;
retrieving, by the CQA computing device, in response to the automatically issued API calls, information from the merchant computing device, the acquirer computing device, the issuer computing device, and the payment network; and
determining, by the CQA computing device, from the retrieved information, which of the merchant computing device, the acquirer computing device, the issuer computing device, or the payment network is a source of the acceptance issue; issue based at least in part on whether transaction information related to the transaction completion attempt reached the payment network;

classifying, by the CQA computing device, the acceptance issue based on at least one of the notification message and results data of the first investigation;
generating, by the CQA computing device, the acceptance issue record based on the classification;
storing, by the CQA computing device, the acceptance issue record in a global service manager acceptance data section of a central memory device;
determining, by the CQA computing device, an impact of the acceptance issue on the payment network, wherein determining an impact comprises determining at least one of a financial impact and a customer quality impact of the acceptance issue;
comparing, by the CQA computing device, the determined impact to a predetermined threshold;
when the impact does not meet the predetermined threshold:
displaying, using the CQA computing device, a recommendation to terminate investigation of the acceptance issue; and
annotating the acceptance issue record stored in the global service manager acceptance data section of the central memory device by updating the classification of the acceptance issue in the acceptance issue record;
determining, by the CQA computing device, when the impact meets the predetermined threshold, a remediation of the acceptance issue based at least partially on the classification and communications between the CQA computing device and the host computing device;
tracking, by CQA computing device, the acceptance issue, the classification, and the remediation using the central memory device;
monitoring, using the CQA computing device, the remediation;
determining, using the CQA computing device, based on the monitoring, that the remediation has been implemented;
updating, using the CQA computing device, the acceptance issue record such that the acceptance issue record indicates that the remediation has been implemented;
continuing to monitor, using the CQA computing device, the remediation after confirming the remediation has been implemented;
determining, by the CQA computing device, based on the continued monitoring, whether the implemented remediation resolves the acceptance issue and whether the implemented remediation has caused other acceptance issues, thereby confirming whether the implemented remediation effectively addresses the acceptance issue; and
outputting, using the CQA computing device, a report for a system administrator based on the acceptance issue record.

2. The method of claim 1, wherein classifying the acceptance issue comprises classifying the acceptance issue based on physical issues and/or processing issues.

3. The method of claim 1, wherein classifying the acceptance issue comprises classifying the acceptance issue based on a determination of the source of the acceptance issue.

4. The method of claim 1, further comprising prioritizing the remediation based on the at least one of the financial impact and the customer quality impact of the acceptance issue.

5. The method of claim 1, wherein determining the financial impact of the acceptance issue comprises determining a financial value added to the payment network as a result of remediating the acceptance issue.

6. The method of claim 1, wherein determining the customer quality impact of the acceptance issue comprises determining at least one of a number of transactions and a number of payment card cardholders that are impacted by the acceptance issue.

7. A customer quality acceptance (CQA) computing device for use in identifying, investigating, tracking, and resolving acceptance issues in a payment network using an acceptance issue record, the acceptance issue record being an improved acceptance issue record that includes a complete management record of the acceptance issue, the CQA computing device comprising one or more memory devices and one or more processors coupled to the one or more memory devices, the one or more processors configured to:

receive a notification message of an acceptance issue occurring somewhere on the payment network, the acceptance issue relating to a transaction completion attempt by a cardholder using a payment card that is processed over the payment network that is rejected, the CQA computing device communicatively coupled between a payment sub-system and a services sub-system over a network, the payment sub-system including a server system and a plurality of client systems communicatively coupled to the server system, the plurality of client systems including a merchant computing device, an acquirer computing device, and an issuer computing device, the services sub-system including a host computing device communicatively coupled to a cardholder computing device, the host computing device communicating with the cardholder computing device through a website associated with a service provider that operates the host computing device, the notification message received at the CQA computing device from the cardholder computing device via the host computing device;
conduct a first investigation to determine whether the merchant computing device, the acquirer computing device, the issuer computing device, or the payment network is a source of the acceptance issue by:
automatically issuing API calls to the merchant computing device, the acquirer computing device, the issuer computing device, and the payment network;
retrieving, in response to the automatically issued API calls, information from the merchant computing device, the acquirer computing device, the issuer computing device, and the payment network; and
determining from the retrieved information, which of the merchant computing device, the acquirer computing device, the issuer computing device, or the payment network is a source of the acceptance issue based at least in part on whether transaction information related to the transaction completion attempt reached the payment network;
classify the acceptance issue based on at least one of the notification message and results data of the first investigation;
generate the acceptance issue record based on the classification;
store the acceptance issue record in a global service manager acceptance data section of a single database;
determine an impact of the acceptance issue on the payment network by determining at least one of a financial impact and a customer quality impact of the acceptance issue;
compare the determined impact to a predetermined threshold;
when the impact does not meet the predetermined threshold:
display a recommendation to terminate investigation of the acceptance issue; and
annotate the acceptance issue record stored in the global service manager acceptance data section of the single database by updating the classification of the acceptance issue in the acceptance issue record;
determine, when the impact meets the predetermined threshold, a remediation for the acceptance issue based on the classification and communications between the CQA computing device and the host computing device;
track the acceptance issue, the classification, and the remediation using the single database;
monitor the remediation;
determine, based on the monitoring, that the remediation has been implemented;
update the acceptance issue record such that the acceptance issue record indicates that the remediation has been implemented;
continue to monitor the remediation after confirming the remediation has been implemented;
determine, based on the continued monitoring, whether the implemented remediation resolves the acceptance issue and whether the implemented remediation has caused other acceptance issues, thereby confirming whether the implemented remediation effectively addresses the acceptance issue; and
output a report for a system administrator based on the acceptance issue record.

8. The computing device of claim 7, wherein the one or more processors are further configured to classify the acceptance issue based on at least one of physical issues and processing issues.

9. The computing device of claim 7, wherein the one or more processors are further configured to classify the acceptance issue based on a determination of the source of the acceptance issue.

10. The computing device of claim 7, wherein the one or more processors are further configured to prioritize the remediation based on the at least one of the financial impact and the customer quality impact of the acceptance issue.

11. The computing device of claim 7, wherein the one or more processors are further configured to determine a financial value added to the payment network as a result of remediating the acceptance issue.

12. The computing device of claim 7, wherein the one or more processors are further configured to determine at least one of a number of transactions and a number of payment card cardholders that are impacted by the acceptance issue.

13. A non-transitory computer readable medium having computer-executable instructions for identifying, investigating, tracking, and resolving acceptance issues in a payment network embodied thereon using a customer quality acceptance (CQA) computing device wherein, when executed by at least one processor of the CQA computing device, the computer-executable instructions cause the at least one processor to:
receive a notification message of an acceptance issue occurring somewhere on the payment network, the acceptance issue relating to a transaction completion attempt by the cardholder using a payment card that is processed over the payment network that is rejected, the CQA computing device communicatively coupled between a payment sub-system and a services sub-system over a network, the payment sub-system including a server system and a plurality of client systems communicatively coupled to the server system, the plurality of client systems including a merchant computing device, an acquirer computing device, and an issuer computing device, the services sub-system including a host computing device communicatively coupled to a cardholder computing device, the host computing device communicating with the cardholder computing device through a website associated with a service provider that operates the host computing device, the notification message received at the CQA computing device from the cardholder computing device via the host computing device;
conduct a first investigation to determine whether the merchant computing device, the acquirer computing device, the issuer computing device, or the payment network is a source of the acceptance issue by:
  automatically issuing API calls to the merchant computing device, the acquirer computing device, the issuer computing device, and the payment network;
  retrieving, in response to the automatically issued API calls, information from the merchant computing device, the acquirer computing device, the issuer computing device, and the payment network; and
  determining from the retrieved information, which of the merchant computing device, the acquirer computing device, the issuer computing device, or the payment network is a source of the acceptance issue based at least in part on whether transaction information related to the transaction completion attempt reached the payment network;
classify the acceptance issue based on at least one of the notification message and results data of the first investigation;
generate the acceptance issue record based on the classification;
store the acceptance issue record in a global service manager acceptance data section of a central memory device;
determine an impact of the acceptance issue on the payment network by determining at least one of a financial impact and a customer quality impact of the acceptance issue;
compare the determined impact to a predetermined threshold;
when the impact does not meet the predetermined threshold:
  display a recommendation to terminate investigation of the acceptance issue; and
  annotate the acceptance issue record stored in the global service manager acceptance data section of the central memory device by updating the classification of the acceptance issue in the acceptance issue record;
determine, when the impact meets the predetermined threshold, a remediation of the acceptance issue based on the classification and communications between the CQA computing device and the host computing device;
track the acceptance issue, the classification, and the remediation using the central memory device;
monitor the remediation;
determine, based on the monitoring, that the remediation has been implemented;
update the acceptance issue record such that the acceptance issue record indicates that the remediation has been implemented;
continue to monitor the remediation after confirming the remediation has been implemented;
determine, based on the continued monitoring, whether the implemented remediation resolves the acceptance issue and whether the implemented remediation has caused other acceptance issues, thereby confirming whether the implemented remediation effectively addresses the acceptance issue; and
output a report for a system administrator based on the acceptance issue record.

14. The computer readable medium of claim 13, wherein the computer-executable instructions further cause the at least one processor to classify the acceptance issue based on physical issues and/or processing issues.

15. The computer readable medium of claim 13, wherein the computer-executable instructions further cause the at least one processor to classify the acceptance issue based on a determination the source of the acceptance issue.

16. The computer readable medium of claim 13, wherein the computer-executable instructions further cause the at least one processor to prioritize the remediation based on the at least one of the financial impact and the customer quality impact of the acceptance issue.

17. The computer readable medium of claim 13, wherein the computer-executable instructions further cause the at least one processor to determine a financial value added to the payment network as a result of remediating the acceptance issue.

18. The method of claim 1, further comprising:
  determining, by the CQA computing device, based on the determined remediation, a time table for implementing the remediation; and
  storing the determined time table in the global service manager acceptance data section of the central memory device in association with the acceptance issue record, wherein monitoring the remediation comprises monitoring the remediation based on the time table stored in the central memory device.

* * * * *